Oct. 13, 1953     T. B. DALTON     2,655,340
SUPPORT FOR SEMITRAILERS

Filed Oct. 25, 1951     3 Sheets-Sheet 1

INVENTOR.
THOMAS B. DALTON
BY
Barnes, Kisselle, Laughlin & Raisch
ATTORNEYS.

INVENTOR.
THOMAS B. DALTON

Oct. 13, 1953  T. B. DALTON  2,655,340
SUPPORT FOR SEMITRAILERS
Filed Oct. 25, 1951  3 Sheets-Sheet 3

INVENTOR.
THOMAS B. DALTON
BY
Barnes, Kisselle, Laughlin & Rauch
ATTORNEYS.

Patented Oct. 13, 1953

2,655,340

UNITED STATES PATENT OFFICE 2,655,340

SUPPORT FOR SEMITRAILERS

Thomas B. Dalton, Muskegon, Mich., assignor to West Michigan Steel Foundry Co., Muskegon, Mich., a corporation of Michigan Application October 25, 1951, Serial No. 253,180

11 Claims. (Cl. 254—86)

This invention relates to a supporting structure for a semi-trailer, for supporting the semi-trailer when it is detached from a tractor.

The road vehicle commonly known as a semi-trailer is one which usually has road engaging wheels at its rear end, and the forward end is arranged to rest upon and to be supported by a tractor when the tractor and the semi-trailer combination is in use. A form of fifth wheel is used for supporting the semi-trailer on the tractor. The tractor and semi-trailer are usually detachable so that the tractor may be interchangeably used with other semi-trailers in a manner and for the purposes well known to those skilled in the art. When the semi-trailer is detached its forward end is supported by a supporting structure or so-called landing gear.

The invention is concerned with such a supporting structure and it has to do with an improved construction by means of which the ground engaging elements thereof may be raised and lowered, it being understood that the ground engaging elements are raised or elevated when the trailer is in use with the tractor.

An object of the invention is to provide an improved construction which employs the highly efficient ball bearing screw for raising, lowering and otherwise adjusting the ground engaging elements of the support. The ball bearing screw construction is so efficient and so lacking in friction that it will not support, with assurance, any substantial load because the parts will turn relative to each other and creep under load with the result that the load will be lowered. Yet the ball bearing screw is very desirable because of its efficiency which results in its being operative with little effort and is capable of lifting heavy loads with relatively little effort.

In accordance with the invention, a locking construction is provided for locking or holding the elements of the ball bearing screw construction from turning under load, and yet this locking construction permits free movement of the parts when the mechanism is operated by the intended means provided for manipulation by an operator. In this connection, the locking means is unidirectional in that it holds the ball bearing screw mechanism against operation when the support is under load and yet permits ease of operation when the mechanism is operated by a crank or the like provided for the purpose.

Another object of the invention is to provide a unidirectional locking mechanism of the type referred to which will effectively hold the support in position and prevent actuation thereof under load, and yet with the application of power to the means intended to operate the mechanism, the load may be lowered by merely supplementing the static load torque sufficiently to overcome the margin of safety incorporated into the locking mechanism. A further object is to provide a supporting leg structure which can be used interchangeably on both the right side and the left side of a semi-trailer, thus eliminating the necessity of manufacturing different parts and types of parts which would otherwise be necessary in making the supporting legs of the landing gear in rights and lefts. A further object of the invention is to provide a fast operating support structure which is operable with such ease that it may be directly manipulated manually by an operator without introduction and use of gearing for increasing the torque ratio which is sometimes necessary with an ordinary screw and nut construction such as the acme screw. Other objects and advantages of the invention will become apparent upon consideration of the following description in connection with the accompanying drawings.

The drawings show a support structure constructed in accordance with the invention:

Figure 1:
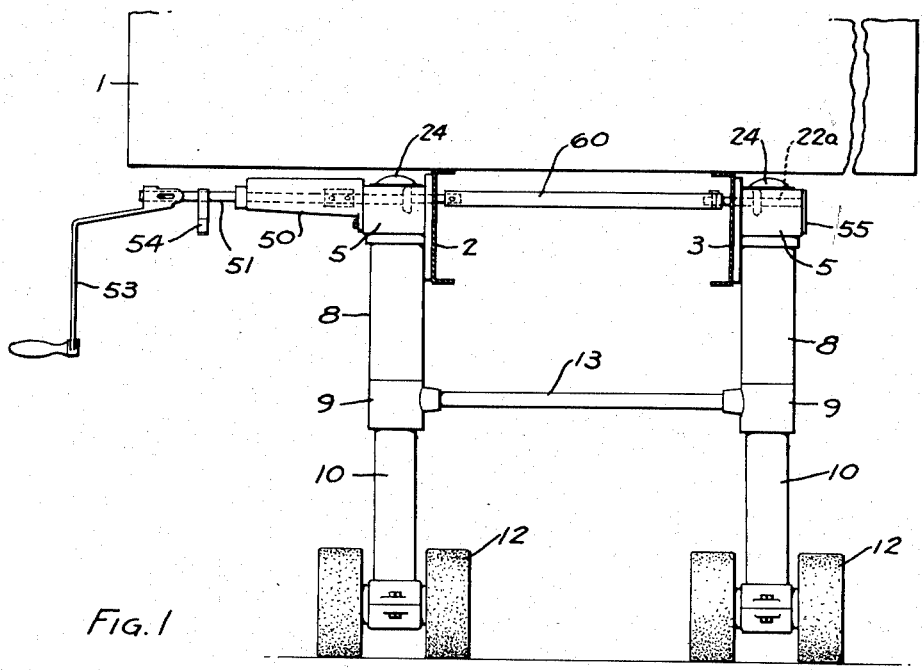
Fig. 1 is a view of general nature looking lengthwise of the trailer vehicle showing the frame thereof in cross section and showing a support applied thereto.
Figure 3:
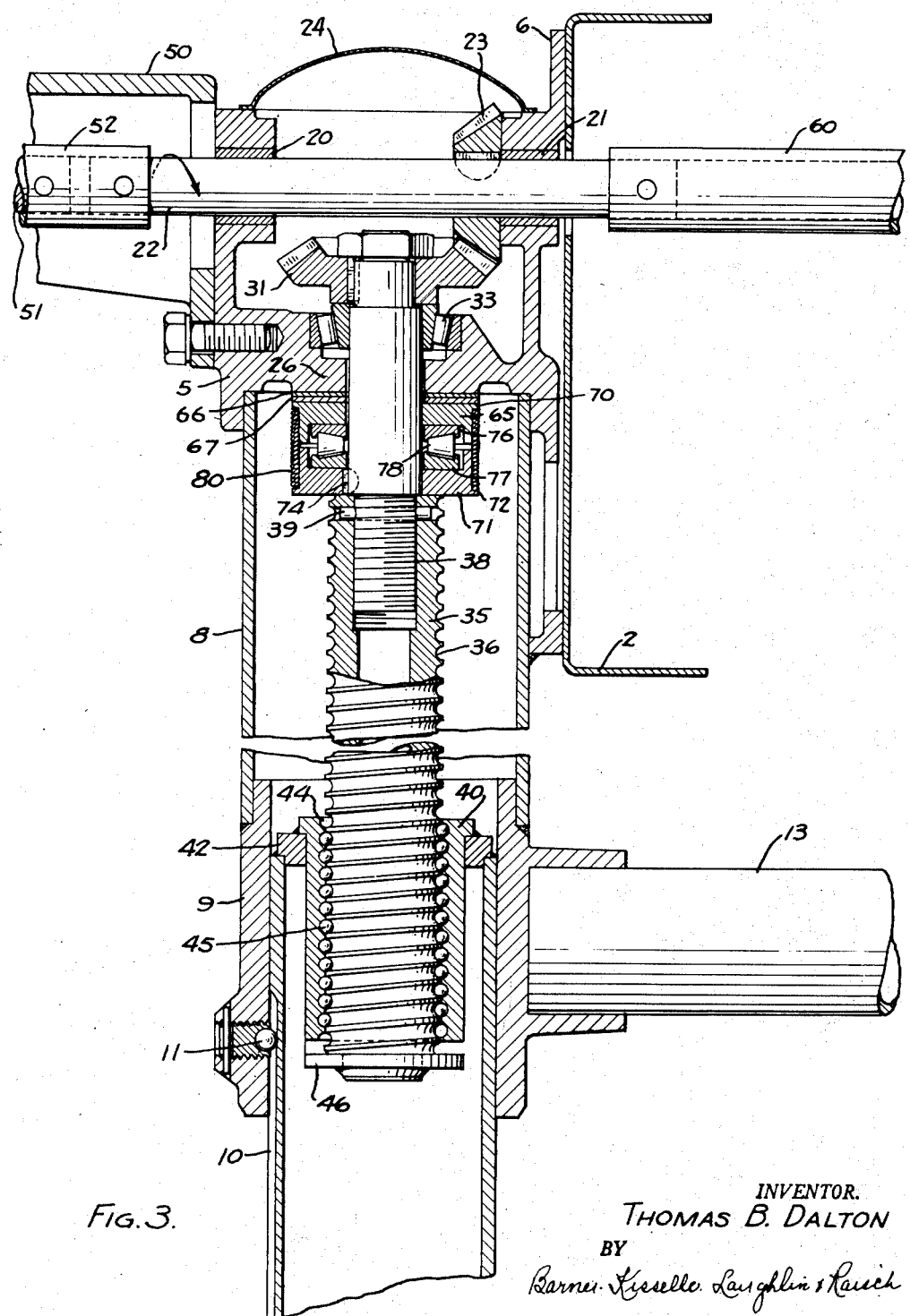
Fig. 3 is an enlarged cross sectional view with parts broken away showing the construction of the operating mechanism.

The body of a trailer and more specifically, a semi-trailer, is illustrated at 1 in Fig. 1, and the frame members of the trailer are illustrated as being of channel construction at 2 and 3. The landing gear or support resides in two supporting legs which may be mounted on the frame members as shown in Fig. 1. The features of construction, however, are illustrated in Fig. 3.

There is an upper housing or case member 5 which may be of steel casting provided with a flange 6 to be placed against and secured to a frame member. Depending from the housing 5 and secured thereto as by means of welding or the like is a tubular member 8. Secured to the lower end of the tubular member 8 is a ring casting 9.

Slidably disposed within the ring casting 9 is a lower tubular leg section 10 having at its lower end thereof suitable ground engaging means herein shown as being in the form of rollers or wheels 12. The leg 10 is slidably keyed to the casting 9 as at 11. The two legs may comprise the same parts as thus far described, and the same reference characters are applied to the two legs as shown in Fig. 1. The members 9 may have a cross brace 13 and when mounted in position each leg may have an angular reinforcing brace 15.

The housing is provided with bearings 20 and 21 for receiving an operating shaft 22, upon which is mounted a pinion or beveled gear 23. The housing may be capped or closed by a cover 24. The lower wall of the housing, as shown at 26, is arranged to receive a shaft 30 which passes therethrough and which has secured to its upper end beveled gear 31, the teeth of which mesh with those of the gear 23. As shown the gears are keyed to their respective shafts. The shaft 30 is journaled in a suitable anti-friction bearing 33 advantageously of the roller type.

The shaft 30 projects below the wall 26 of the housing and has secured thereto a ball bearing screw 35, the same having a helical groove 36 therein for receiving the balls as will presently be seen. The screw member is advantageously threaded to the shaft 30 as indicated at 38 and pinned thereto as at 39 to form a secure connection.

The upper end of the leg 10 is provided with a ball bearing nut 40 through which the screw 35 passes. The nut may be applied by means of an adapter ring 42 welded to the upper end of the leg member 10 and welded to the nut 40. The nut 40 has an internal helical groove 44 for receiving the balls. As indicated in Fig. 3 the screw passes through the nut, and balls which maybe termed "ball bearings," are interengaged in the helical groove 36 and helical groove 44. The balls are indicated at 45. Such a ball bearing screw is well known to those versed in the art and suffice it to say when the screw member and nut member are turned relative to each other, that there is a relative axial movement determined by the pitch of the helical grooves. Moreover, since the rolling balls interconnect the screw and the nut, there is very little friction and an axial load is resisted by the shear action on the balls. The lower end of the screw member may have a washer 46 thereon for limiting the downward movement of the nut 40.

As shown in Fig. 1, a bracket 50 is secured to one of the supporting legs and it supports a shaft 51 connected to the driving shaft 22 by a suitable coupling 52. A crank 53 may be mounted on the end of the shaft 51 in such a manner that it may be disposed in operating position, as shown in Fig. 1, or folded relative to the shaft 51 and placed in a hook 54. When the crank is placed in the hook 54 it may be employed to prevent rotation of the shafts 51 and 22. When a leg as thus described is placed on the other frame member or to the right, as Fig. 1 is viewed, the bracket 50 need not be employed and instead the housing 5, for that leg, may be closed by a plate 55. In this case, the shaft 22a is constructed so that it may be covered by the plate 55. A connecting element 60 interconnects the inner ends of the shaft 22 and the shaft 22a so that operation of the crank simultaneously operates the screws of the two legs.

The interlocking arrangement involves a unidirectional locking clutch. There is an upper clutch member 65 freely positioned about the shaft 30 and arranged to thrust against the portion 26 of the housing. For this purpose, there may be an upper clutch plate 66 directly engaging the housing and a lower clutch plate 67 positioned between the clutch member 65 and the clutch plate 66. The clutch member 65 has an accurately formed peripheral surface and a flange 70 at its upper end. Thus the clutch member 65 indirectly frictionally engages the part 26 of the housing.

A similar clutch member 71 is disposed in opposing relationship to the clutch member 65 and it has an accurately formed peripheral surface and a lower flange 72. The clutch member 71 is keyed to the shaft 30 as at 74. The upper end of the screw member 35 is in direct abutting relationship with the lower clutch member 71. Positioned between the two clutch members is an anti-friction thrust bearing constituted, as shown herein, by an upper race 76, a lower race 77, and interposed roller bearings 78.

The clutch element for interengaging the two clutch members 65 and 71 is a coil spring 80. This coil spring is accurately formed on its inside diameter to nicely fit the external peripheral surfaces of the clutch members 65 and 71. Moreover, the spring is positioned between the shoulders 70 and 72 so that it is retained in position. The end portions of this spring are shown at 81 and 82. The direction of the helix of the convolutions of the spring is such that when torque or turning motion is applied to the shaft 30 and, therefore, the clutch member 71 in one direction, the tendency is to unwrap the spring so that one clutch member may be turned freely relative to the other with practically no friction or resistance insofar as the spring is concerned. When torque is applied in the other direction, however, the tendency is to wrap the spring upon the clutch members and contract its convolutions about the clutch members to thus tie or lock the clutch members together.

As will more clearly appear in considering the operation of the apparatus, the clutch plate 67 is selected as to material and physical dimensions to provide the desired resistance when serving to lock the parts against movement under load. In this connection, the upper clutch plate 66 which directly engages the housing, may be of steel, while the lower clutch plate 67 may be of a form of sintered or porous metal containing a lubricant. Such a material is one known as "Oilite."

In the operation of the construction, let it be assumed that a turning of the shaft 22 in a clockwise direction looking from the left of Fig. 3 and as indicated by the arrow, turns the screw 35 clockwise as one looks from the lower end of Fig. 3, and as indicated by the arrow, to thus cause the nut 40 to move downwardly on the screw and project the leg portion 10. In this direction of rotation of the screw and, therefore, the clutch member 71, the clutch spring 80 is unwrapped and loosened relative to at least one of the clutch members 65 and 71. Therefore, the clutch member 71 turns freely with respect to clutch member 65. If at this time the rollers 12 are in engagement with the ground, roadway or other support, the trailer frame is elevated together with whatever load is on the trailer. The downward thrust of this load is transmitted through the housing 5, through the clutch plates 66 and 67, the clutch member 65, through the bearing 78, clutch member 71 and thence into the screw member 35 and the nut 40. Inasmuch, however, as the clutch member 71 may be freely turned relative to the clutch member 65, because the spring 80 is not binding them together, the shaft 30, clutch member 71 and screw 35 may be relatively easily turned, depending upon the load thereon, as the clutch member 71 turns relative to the clutch member 65 on the anti-friction bearing 78. When the torque on the shaft 22 is released, the thrust of the load due to the ball bearing screw and nut arrangement, places a torque on the shaft 35 in the opposite direction. This tends or starts to turn the clutch member 71, and instantly the clutch spring 80, whose convolutions frictionally engage the peripheral surfaces of the clutch members 65 and 71 is contracted, or wound upon, so to speak, the two clutch members, thus gripping them and locking them together. Thus the clutch member 65 tends to rotate in said reverse direction relative to the housing wall 26 which rotation is checked by the friction present in the clutch plates.

The material and the physical dimensions of the clutch plates, and particularly the clutch plates 67, is selected to offer sufficient resistance to prevent rotation in said reverse direction incident to the load, with the result that the load is held supported in position. It is preferred to so select the material of the clutch plate or plates, so that the friction not only overcomes the static load torque placed on the shaft 35, but has an additional safety factor which with good engineering practice, may be an added safety factor of about 20%. With this added safety factor, which holds practically constant under all loads within the operating limits of the construction, there is assurance that there is no relative movement of the nut and screw member under load and, therefore, no lowering of the trailer frame as it stands under load over a period of time.

However, the trailer and its load, if any, may be lowered by the turning of the operating shaft 51. The torque required to be placed on the operating shaft so that the trailer and its load may be lowered is substantially only that necessary to overcome the safety factor built into the friction clutch plates which, as above stated, may be about 20%.

Figure 2:
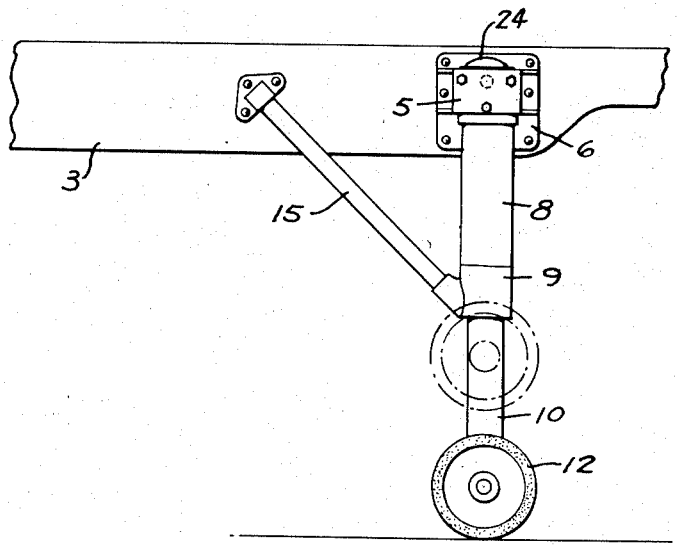
Fig. 2 is a side elevational view looking from the right hand side of Fig. 1 and illustrating, in dotted lines, an elevated position of the ground engaging element.

When the vehicle is operating over the highway with the ground supporting elements raised to a position as shown in dotted lines in Fig. 2, the crank may be positioned angularly with respect to the shaft 51 and engaged in the retaining hook 54 and this may be relied upon to prevent lowering of the extensible portions of the legs due to vibrations and shocks of operation.

Figure 6:
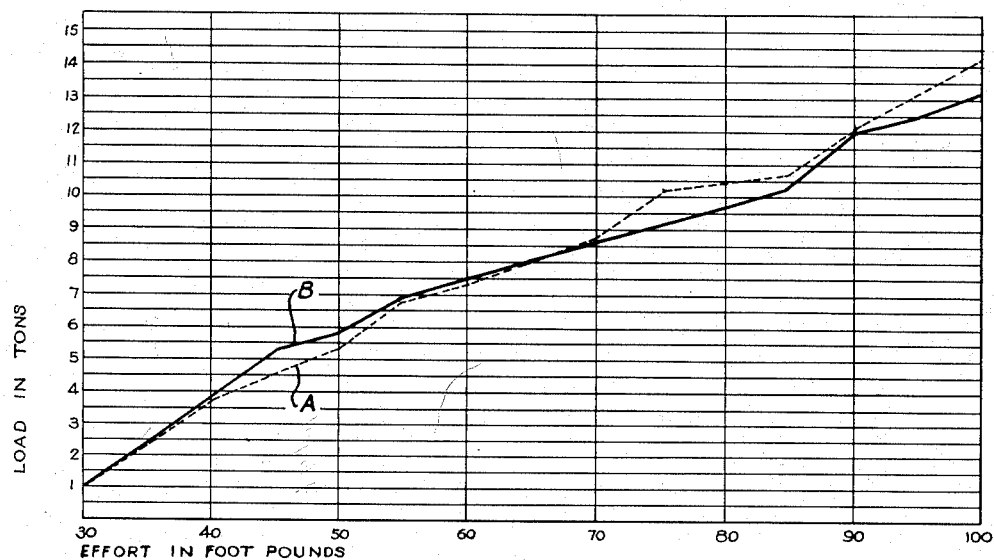
Fig. 6 is a diagram illustrating a chart showing one of the functions of the construction.
Figure 4:
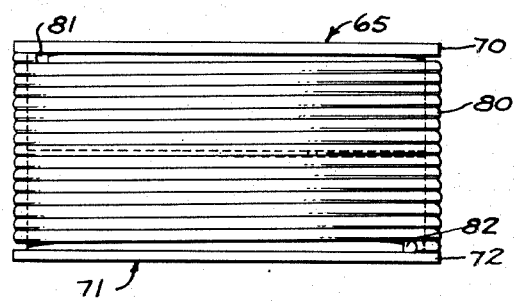
Fig. 4 is a detailed view showing the locking clutch elements.
Figure 5:
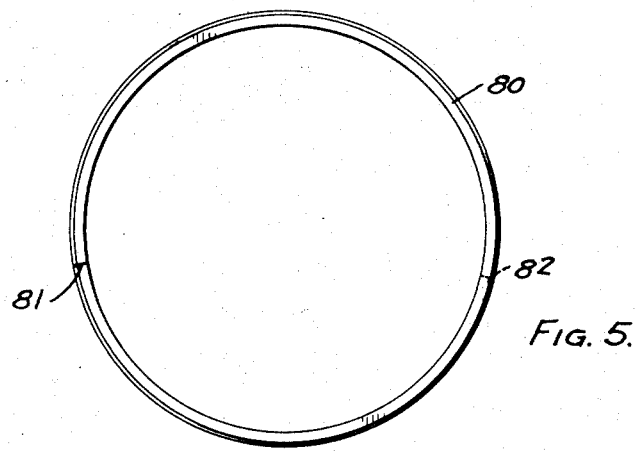
Fig. 5 is an end view of a locking coil spring.

The chart of Fig. 6 demonstrates the efficiency of this construction. This chart represents the effort in foot pounds for load given in units of 1000 pounds. The curve A, of dash lines, is representative of the construction of the present invention wherein five revolutions of the crank imparts an axial movement of the screw relative to the nut or, in other words, a raising of the load, 1". The curve B is representative of a construction with an acme screw wherein 16 turns of the crank is required to raise the load 1". From this it will be appreciated that the raising and the lowering action with the ball bearing screw is more than three times as fast as it is with the acme thread and yet the effort required for a given load is approximately the same. Moreover, it will be seen that the provision of gearing in order to increase the torque ratio and obtain the sixteen turns to 1" is eliminated. The two legs, accordingly, of a supporting structure may be substantially the same except possibly for the length of the shaft 22a which does not need to extend from the right hand side of Fig. 1 and which may be covered by the plate 55.

Of course, when the legs are raised or lowered when not under load, the same is accomplished with extreme ease and with fast action.

I claim:

1. In a supporting structure for a trailer, a leg mounted for movement to and from projected and retracted positions, a support part secured to the trailer, a screw member and a nut member in threaded engagement, one member mounted on the leg and one member mounted on the support part, means for rotating one member relative to the other to project and retract the leg so that the leg may support the trailer when projected, a clutch element secured to the rotary member to rotate therewith and to take the vertical load of the trailer, another clutch element free of the rotary member and arranged to frictionally engage said support part, bearing means between the clutch elements for relative rotation of the clutch elements and for transmitting the load of the trailer to said other clutch element, said clutch elements having engaging surfaces, and a coil spring with convolutions in engagement with said surfaces, the helix of the convolutions being in such direction that when the rotary member is rotated by the operating means in a direction to project the leg, the convolutions substantially release engagement with at least one clutch element and when the rotary member tends to turn in the opposite direction incident to the load of the trailer, the convolutions tighten against said surfaces to tie said clutch elements together, whereby the rotary member is held against turning by the frictional engagement of said other clutch element with said support part.

2. In a supporting structure for a trailer, a leg mounted for movement to and from projected and retracted positions, a support part secured to the trailer, a screw member and a nut member in threaded engagement by means of balls, one member mounted on the leg and one member mounted on the support part, means for rotating one member relative to the other to project and retract the leg so that the leg may support the trailer when projected, a clutch element secured to the rotary member to rotate therewith and to take the vertical load of the trailer, another clutch element free of the rotary member and arranged to frictionally engage said support part, bearing means between the clutch elements for relative rotation of the clutch elements and for transmitting the load of the trailer to said other clutch element, said clutch elements having engaging surfaces, and a coil spring with convolutions in engagement with said surfaces, the helix of the convolutions being in such direction that when the rotary member is rotated by the operating means in a direction to project the leg, the convolutions substantially release engagement with at least one clutch element and when the rotary member tends to turn in the opposite direction incident to the load of the trailer, the convolutions tighten against said surfaces to tie said clutch elements together, whereby the rotary member is held against turning by the frictional engagement of said other clutch element with said support part.

3. In a supporting structure for a trailer, a leg mounted for movement to and from projected and retracted positions, a support part secured to the trailer, a screw journaled in the support part, a nut on the leg in threaded engagement with the screw, a multiplicity of balls forming a threaded connection between the screw and the nut, operating means for turning the screw to project and retract the leg so that it may support the trailer when projected, a screw locking device for transmitting the thrust load to said support part including a clutch member secured to the screw to rotate therewith, another clutch member freely rotatable relative to the screw and positioned for frictional engagement with said support part, a thrust transmitting bearing positioned between the clutch elements for taking the vertical load of the trailer, and a coil spring having convolutions engaging both clutch elements, the direction of the helix of the convolutions being such that when the screw is rotated to project the leg the convolutions substantially release engagement with the clutch elements and when the screw tends to turn in the reverse direction incident to the load of the trailer, the convolutions tighten the engagement with the elements, whereby the screw is held against rotation incident to load of the trailer by the frictional engagement of the second named clutch element with said support part.

4. In a supporting structure for a trailer, an extensible and retractable leg member, a screw and a nut with an anti-friction thread connection operable to extend and retract the leg portion, operating means for turning the screw, a relatively fixed support member, means for taking the trailer load on the screw including a clutch element keyed to the screw, a clutch element rotatable relative to the screw and for frictional engagement with the said relatively fixed support member, anti-friction bearing means between the two clutch elements for taking the trailer load, and a coil spring having convolutions for engaging surfaces of the two clutch elements, the convolutions being so directed that when the operating means turns the screw to project the leg portion the convolutions are loosened to relatively disengage the two clutch elements, and so that when the screw tends to turn in the opposite direction under load of the trailer the convolutions of the spring are tightened on the two clutch elements, whereby the second named clutch element which frictionally engages the relatively fixed support prevents such turning of the screw.

5. In a supporting structure for a trailer, an extensible and retractable leg structure, a screw member and a nut member with an anti-friction type of thread connection operable to extend and retract the leg portion, operating means for turning one member, a relatively fixed support, means for taking the trailer load including a clutch element keyed to the turnable member, a clutch element rotatable relative to the turnable member for frictional engagement with the fixed support, anti-friction bearing means between the two clutch elements for transmitting the trailer load, and a coil spring having convolutions for engaging surfaces of the two clutch elements, the direction of the helix of the convolutions being such that when the operating means turns the said turnable member to project the leg portion the convolutions are loosened to relatively disengage the two clutch elements, and so that when the turnable element tends to turn in the opposite direction under load of the trailer the convolutions are tightened on the two clutch elements to lock them together, whereby the second named clutch element which frictionally engages the relatively fixed support prevents such turning.

6. In a supporting structure for a trailer, an extensible and retractable leg structure, a screw member and a nut member with an anti-friction type of thread connection operable to extend and retract the leg portion, operating means for turning one member, a relatively fixed support, means for taking the trailer load including a clutch element keyed to the turnable member, a clutch element rotatable relative to the turnable member, means providing frictional engagement between the second named clutch element and the fixed support, anti-friction bearing means between the two clutch elements, and a coil spring having convolutions for engaging surfaces of the two clutch elements, the direction of the helix of the convolutions being such that when the operating means turns the said turnable member to project the leg portion the convolutions are loosened to relatively disengage the two clutch elements, and so that when the turnable element tends to turn in the opposite direction under load of the trailer the convolutions are tightened on the two clutch elements to lock them together, whereby the second named clutch element which frictionally engages the relatively fixed support prevents such turning, the frictional engagement of the second named clutch element with the fixed support having a capacity in excess of the torque placed on the turnable element incident to load of the trailer, whereby the leg portion may be retracted while supporting the trailer by applying force to the operating means sufficient to overcome said excess capacity.

7. In a supporting structure for a trailer, an extensible and retractable leg structure, a screw member and a nut member with an anti-friction type of thread connection operable to extend and retract the leg portion, operating means for turning one member, a relatively fixed support, means for taking the trailer load including a clutch element keyed to the turnable member, a clutch element rotatable relative to the turnable member acting against and turnable relative to the fixed support, anti-friction bearing means between the two clutch elements, and a coil spring having convolutions for engaging surfaces of the two clutch elements, the direction of the helix of the convolutions being such that when the operating means turns the said turnable member to project the leg portion the convolutions are loosened to relatively disengage the two clutch elements, and so that when the turnable element tends to turn in the opposite direction under load of the trailer the convolutions are tightened on the two clutch elements to lock them together, whereby the second named clutch element which acts against the relatively fixed support prevents such turning, and an interposed friction clutch plate between the second named clutch element and the relatively fixed support for providing frictional capacity of the frictional engagement in excess of turning effort transmitted to the second clutch element incident to the load of the trailer.

8. In a supporting structure for a trailer, an extensible and retractable leg structure, a screw member and a nut member with an anti-friction type of thread connection operable to extend and retract the leg portion, operating means for turning one member, a relatively fixed support, means for taking the trailer load including a clutch element keyed to the turnable member, a clutch element rotatable relative to the turnable member having frictional engagement with and rotatable relative to the fixed support, thrust bearing means between the two clutch elements of the anti-friction type, and a coil spring having convolutions for engaging surfaces of the two clutch elements, the direction of the helix of the convolutions being such that when the operating means turns the said turnable member to project the leg portion the convolutions are loosened to relatively disengage the two clutch elements, and so that when the turnable element tends to turn in the opposite direction under load of the trailer the convolutions are tightened on the two clutch elements to lock them together, whereby the second named clutch element which frictionally engages the relatively fixed support prevents such turning.

9. In a supporting structure for a trailer, an extensible and retractable leg member, a screw member and a nut member with an anti-friction thread connection, one of which is turnable relative to the other to extend and retract the leg portion, operating means for turning the turnable member, a relatively fixed support, means for taking the trailer load including a clutch member keyed to the turnable member, a clutch member rotatable relative to the turnable member and having frictional engagement with the fixed support, anti-friction thrust bearing means between the clutch elements, and an expansible and contractable coil spring having convolutions for engaging surfaces of the two clutch elements, the direction of the helix of the convolutions being such that when the operating means turns the turnable element to project the leg portion, the spring is flexed and the convolutions thereof loosened from the clutch elements so that the first clutch element may turn freely relative to the second clutch element, and so that when the turnable element tends to turn in the opposite direction, due to torque incident to the load of the trailer, the spring is flexed and the convolutions thereof grip the two elements to lock them together, whereby the second named clutch element which frictionally engages the relatively fixed support prevents such turning of the turnable member.

10. In a supporting structure for a trailer, an extensible and retractable leg member, a screw member and a nut member with an anti-friction thread connection, one of which is turnable relative to the other to extend and retract the leg portion, operating means for turning the turnable member, a relatively fixed support, means for taking the trailer load including a clutch member keyed to the turnable member, a clutch member rotatable relative to the turnable member and having frictional engagement with the fixed support, said clutch elements having external peripheral surfaces, anti-friction bearing means between the clutch elements, and an expansible and contractable coil spring positioned around said clutch elements and having convolutions for engaging said surfaces of the two clutch elements, the direction of the helix of the convolutions being such that when the operating means turns the turnable element to project the leg portion, the spring is expanded and the convolutions thereof loosened from the clutch elements so that the first clutch element may turn freely relative to the second clutch element, and so that when the turnable element tends to turn in the opposite direction, due to torque incident to the load of the trailer, the spring is contracted and the convolutions thereof grip the two elements to lock them together, whereby the second named clutch element frictionally engages the relatively fixed support under the load of the trailer to prevent such turning of the turnable member.

11. A locking clutch construction for use with a ball bearing type of screw and nut assembly for taking an axial load wherein one member of the assembly is turnable relative to the other comprising, a clutch element arranged to be secured to the turnable member, a second clutch element arranged to be freely rotatable relative to the said turnable member and for frictional engagement with a relatively fixed support to take the axial load on the assembly, anti-friction bearing means between the clutch elements, and a coil spring having convolutions for engagement with the two clutch elements, the direction of the helix of the convolutions of the spring being such that when the turnable member of the assembly is rotated in one direction, the convolutions of the spring are loosened from the two clutch elements, whereby the clutch element which is secured to the turnable member may rotate freely relative to the other, and so that when the turnable element of the assembly tends to rotate in the opposite direction incident to thrust load on the assembly, the convolutions of the spring frictionally engage the clutch elements to lock them together, whereby turning of the turnable member in the opposite direction is resisted by the frictional engagement of the second clutch element with the fixed support.

THOMAS B. DALTON.

References Cited in the file of this patent

UNITED STATES PATENTS

| Number | Name | Date |
|---|---|---|
| 691,691 | Wyman | Jan. 21, 1902 |
| 1,565,805 | Jones | Dec. 15, 1925 |
| 1,749,066 | Burton | Mar. 4, 1930 |
| 2,052,961 | Bonham | Sept. 1, 1936 |
| 2,336,757 | Starkey | Dec. 14, 1936 |
| 2,446,517 | Black | Aug. 10, 1948 |
| 2,550,801 | Geerds | May 1, 1951 |